UNITED STATES PATENT OFFICE.

HENRY MARTIN HULL, OF FAIRFIELD, CONNECTICUT.

MINUTE CEREAL AND PROCESS OF MAKING THE SAME.

1,233,238.
Specification of Letters Patent.
Patented July 10, 1917.

No Drawing.
Application filed November 8, 1915. Serial No. 60,332.

*To all whom it may concern:*

Be it known that I, HENRY M. HULL, citizen of the United States, residing at Fairfield, Connecticut, have invented certain new and useful Improvements in Minute Cereals and Processes of Making the Same, of which the following is a specification.

My invention is designed to produce what I term a minute cereal, and to so treat the cereal that it may be prepared for the table very quickly without losing anything in nutrition while being very palatable and easily digested, simply requiring stirring in boiling water about the time specified.

In carrying out my invention I grind the cereal so that part of it is reduced to the fineness of flour and the balance to small granules, the floury portion constituting about one-third of the bulk and being adapted to take up the water very fast, while the small granules give body to the preparation, permitting a progressive action from the ready absorption of the floury matter by the hot water to the somewhat slower action upon the larger granules.

What I term my minute cereal is thoroughly cooked before it reaches the consumer and is ready for use by simply stirring it into boiling water and boiling it approximately one minute. I cook the cereal, by boiling, either under steam pressure or in water in a kettle so constructed that the cereal shall not burn as the cooking nears completion, until the grains are thoroughly broken down so that they are in the condition of mush. This requires in general one to two hours depending upon the character of the cereal; it may be even longer as is the case with barley. This makes the product more nutritious and more readily digested than when cooked for a lesser period. I have found in practice that the cereals cannot be reduced to be prepared quickly as stated unless they have been previously thoroughly cooked and broken down to a mushy state, because so long as a kernel holds its form there are certain portions which are not absolutely soft, and after these firm portions have been thoroughly dried out they will grind into granules which will not soften up quickly enough for a minute cereal and as a result there will be hard granules in the cooked cereal.

After the cooking is completed I pour the material into pans and thoroughly dry in a medium oven. This dries out all the moisture, puts it in proper condition for grinding, and it may be kept in this condition without deterioration.

I then grind the material so as to produce as the finished product a mixture of flour and small granules the flour being as stated about one-third of the bulk. The floury portion absorbs the water rapidly and what is called a minute cereal cannot be produced without this and at the same time the small granules are necessary to give body to the cereal as without the granules the cereal will be too floury to be palatable.

The material in this form may be prepared for the table as follows:

Provide four to six cups of water salted to the taste and boiling hard in a suitable vessel. To this add one cup of the cereal pouring in slowly and stirring constantly to avoid lumping, as soon as it thickens (thirty seconds to one and one-half minutes) remove from the fire and serve.

What I claim is:

1. The herein described method of preparing a minute cereal consisting in thoroughly cooking the cereal until it is in a mushy state; thoroughly drying the same until it is ready for grinding and then subjecting the mass to a grinding action which will reduce it to a combined state of flour and granules, substantially as described.

2. The herein described process of making a minute cereal consisting in thoroughly cooking the cereal until the grains are broken down; thoroughly drying the cooked material and then grinding the cooked dried mass reducing it to part flour and part granules, the flour being about one-third of the bulk, substantially as described.

3. The herein described minute cereal comprising a combined floury and granular mass which has been thoroughly cooked and dried and is ready for serving by being added to boiling water, substantially as described.

In testimony whereof, I affix my signature in presence of two witnesses.

HENRY MARTIN HULL.

Witnesses:
NELLIE J. DOYLE,
RICHARD G. DEMAEUT.